US006848463B2

(12) United States Patent
Johansen

(10) Patent No.: US 6,848,463 B2
(45) Date of Patent: Feb. 1, 2005

(54) VAPOR VENT VALVE

(75) Inventor: Mark R. Johansen, Wallingford, CT (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 0 days.

(21) Appl. No.: 10/358,705

(22) Filed: Feb. 5, 2003

(65) Prior Publication Data

US 2004/0149333 A1 Aug. 5, 2004

(51) Int. Cl.[7] ............................................. F16K 24/04
(52) U.S. Cl. ..................................... 137/202; 137/43
(58) Field of Search .................................. 137/43, 202

(56) References Cited

U.S. PATENT DOCUMENTS

| | | | |
|---|---|---|---|
| 4,753,262 A | 6/1988 | Bergsma | 137/39 |
| 5,313,977 A | 5/1994 | Bergsma et al. | 137/43 |
| 5,590,697 A | 1/1997 | Benjey et al. | 141/59 |
| 5,592,963 A | 1/1997 | Bucci et al. | 137/202 |
| 5,605,175 A | 2/1997 | Bergsma et al. | 137/202 |
| 5,797,434 A | 8/1998 | Benjey et al. | 141/59 |
| 5,960,817 A | 10/1999 | Johansen et al. | 137/202 |
| 6,058,963 A | 5/2000 | Enge et al. | 137/202 |
| 6,085,771 A | 7/2000 | Benjey et al. | 137/15.26 |
| 6,145,532 A | 11/2000 | Tuckey et al. | 137/202 |
| 6,213,100 B1 | 4/2001 | Johansen | 123/509 |
| 6,247,492 B1 | 6/2001 | Stuart | 137/413 |
| 6,257,287 B1 | 7/2001 | Kippe et al. | 141/98 |
| 6,302,144 B1 | 10/2001 | Graham et al. | 137/565.17 |
| 6,311,675 B2 | 11/2001 | Crary et al. | 123/516 |

*Primary Examiner*—Gerald A. Michalsky
(74) *Attorney, Agent, or Firm*—Reising, Ethington, Barnes, Kisselle, P.C

(57) ABSTRACT

A vapor vent valve for a fuel tank that includes a vapor outlet that connects an interior of the fuel tank with an exterior of the fuel tank. The vent valve also includes a fill cup that has an opening at one end and a sidewall that extends from the open end. A shell defines an interior space and is disposed partially in the fill cup. The shell includes a sidewall that has an opening and an upper edge. A flow passage is defined between the fill cup's sidewall and the shell sidewall to allow fluid which flows into the opening of the fill cup to enter the interior space through the opening in the sidewall of the shell. A float is received in the interior space and is responsive to the level of liquid fuel in the interior space. A closure pivotally carried by the shell is movable to a closed position to prevent fluid flow through the vapor outlet. The closure is also movable to an open position which allows fuel vapor to exit the fuel tank. The closure includes a carrier plate that has an elastomeric layer attached to the carrier plate. The elastomeric layer includes a portion that is attached to the float for actuating the closure to the open and closed positions.

10 Claims, 2 Drawing Sheets

VAPOR VENT VALVE

FIELD OF THE INVENTION

This invention relates to a vapor vent valve for a vehicle fuel tank, and more particularly to a vapor vent valve having a closure that includes an elastomeric layer attached to a single float.

BACKGROUND OF THE INVENTION

Environmental concerns and governmental regulations require reduced emissions of volatile hydrocarbon fuel vapors into the atmosphere. One source of hydrocarbon fuel vapors is fuel tanks of vehicles using gasoline or other high volatility hydrocarbon fuels. Fuel vapor can escape to the atmosphere during filling of fuel tanks and even after the tanks are filled. The use of vapor recovery systems to remove excess fuel vapor from the fuel tank is one solution that is commonly used to abate the problem. Such systems may include, a canister having activated charcoal therein which receives fuel vapors through a valve assembly mounted in the top of the fuel tank and communicates with the intake manifold of the vehicle engine for withdrawing fuel vapor from the canister during operation of the engine. The valve assembly may have a valve responsive to the level of fuel in the tank that enables the valve to stay open when there is a low fuel level to permit fuel vapors to flow from the fuel tank into the canister. As the level of fuel rises during a refueling operation, a float is raised to close the valve to prevent liquid fuel from flowing through the valve and into the vapor recovery system.

Governmental regulations also mandate that a vapor control valve remain closed during a vehicle rollover, such that fuel does not escape from the fuel tank and pose a hazard.

Therefore, there is a need in the art for a vent valve that complies with the environmental concerns and governmental regulations, is of a simple design that does not require complex interactions among components, cost-effective, and in service has a long useful life.

SUMMARY OF THE INVENTION

For a fuel tank, a vapor vent valve assembly with a vapor outlet that connects an interior of the fuel tank with an exterior of the fuel tank. The vent valve also includes a fill cup that has an opening at one end and a sidewall that extends from the open end. A shell defines an interior space and is disposed partially in the fill cup. The shell includes a sidewall that has an opening and an upper edge. A flow passage is defined between the fill cup's sidewall and the shell sidewall to allow fuel which flows into the opening of the fill cup to enter the interior space through the opening in the sidewall of the shell. A float is received in the interior space and is responsive to the level of liquid fuel in the interior space. A closure pivotally carried by the shell is movable to a closed position to prevent fluid flow through the vapor outlet. The closure is also movable to an open position which allows fuel vapor to exit the fuel tank. The closure includes a carrier plate that has an elastomeric layer attached to the carrier plate. The elastomeric layer includes a portion that is attached to the float for actuating the closure to the open and closed positions.

Objects, features and advantages of this invention include a vapor vent valve which complies with governmental environmental regulations, has a high vapor flow rate or capacity, during refueling provides timely actuation of an automatic shut-off of a fuel dispensing nozzle as the tank reaches its desired filled fuel level, prevents fuel spit-back during filling, enables multiple shut-offs of the fuel filler nozzle during refueling, prevents the canister from receiving liquid fuel even under fuel splashing and sloshing conditions, closes in a vehicle roll-over condition, maintains a fuel tank gas vapor dome under attempted overfilling conditions, is sensitive and responsive to changes in fuel level and is rugged, durable, reliable, and of relatively simple design, economical manufacture and assembly, and has a long useful life in service.

BRIEF DESCRIPTION OF THE DRAWINGS

These and other objects, features and advantages of this invention will be apparent from the following detailed description of the preferred embodiment and the best mode presently contemplated for this invention, appended claims and accompanying drawings in which:

DETAILED DESCRIPTION OF THE PREFERRED EMBODIMENTS

Figure 1:
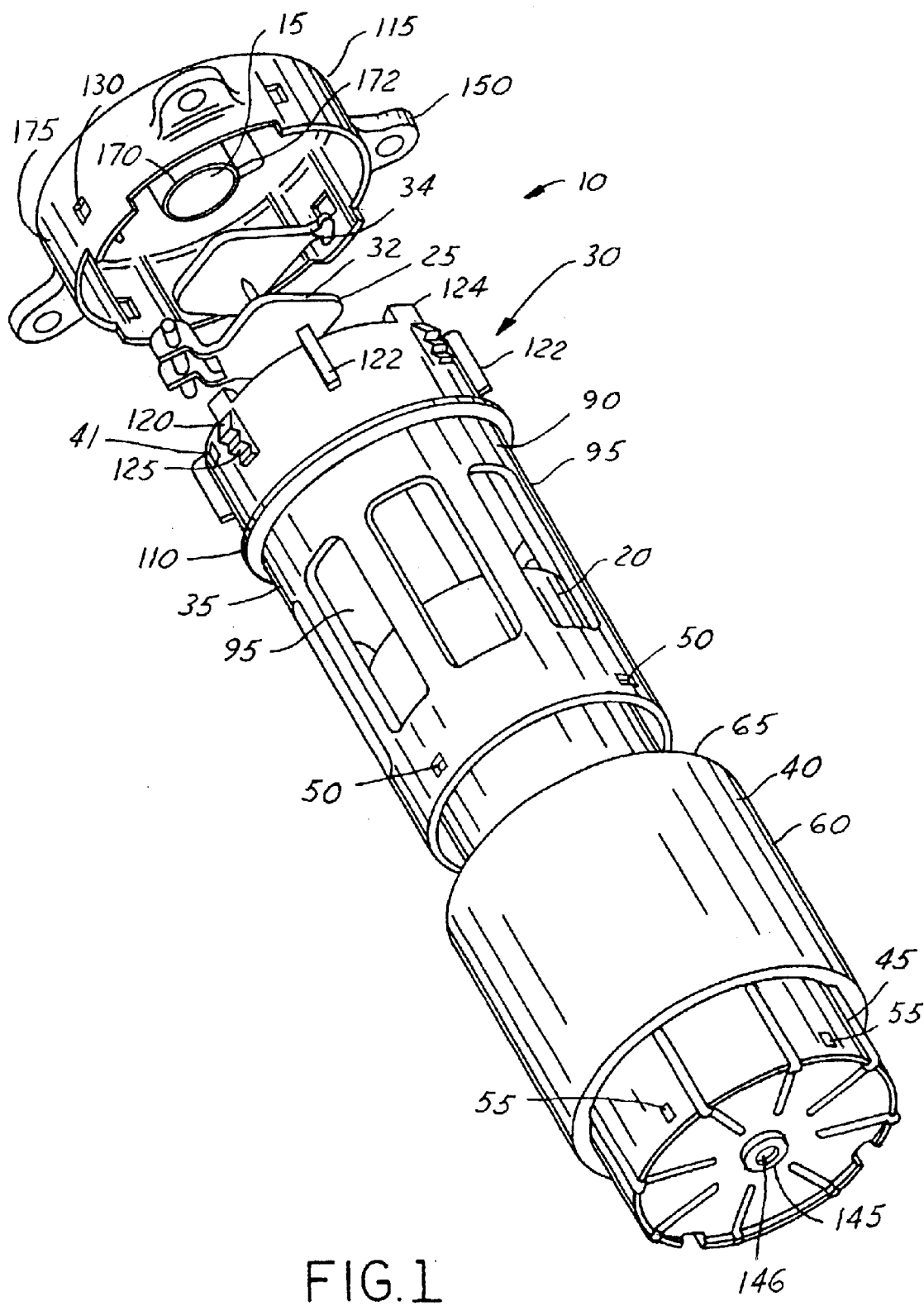
FIG. 1 is a perspective view of a vapor vent valve embodying the present invention.

FIG. 1 illustrates a fuel vapor vent valve 10 embodying this invention constructed to be mounted on a fuel tank in communication with the interior of the fuel tank and selectively permits fuel vapor to flow out of the fuel tank through a vapor outlet 15 of the vent valve 10. The vapor vent valve 10, as shown, is a stand-alone component which may be separately mounted on the fuel tank, or alternatively may be incorporated as a portion of a fuel pump module that is mounted on the fuel tank. The vent valve 10 has a float 20 which actuates a closure 25 that is engageable with the vapor outlet 15 to substantially close the vapor outlet 15.

During refueling, the shutoff of the vapor outlet 15 controls the filling of the fuel tank. When the closure 25 engages the vapor outlet 15, vapor flow out of the fuel tank is restricted and pressure within the tank increases. This causes fuel to back up within a fill pipe of the fuel tank, thereby closing off a control port of a refueling nozzle as is commonly known in the art. The closure 25 may move away from the vapor outlet 15 to reduce the pressure in the tank. Thus, additional fuel may be added to the tank even after the first shutoff event. Subsequent shutoff events are caused by reengagement of the closure 25 with the vapor outlet 15 when a maximum fill limit level of the fuel tank has been reached. This prevents overfilling of the fuel tank and maintains a vapor dome in the upper portion of the fuel tank.

The vapor outlet 15 of the vent valve 10 typically communicates with a fuel vapor recovery device such as a canister that is part of a fuel vapor recovery system. The canister is filled with activated charcoal to absorb the hydrocarbon vapors received from the vent valve. The canister typically has an outlet through which fuel vapors are discharged to an intake manifold of the engine for combustion of the fuel vapors in a normal combustion cycle of the engine. The canister may be mounted in various locations on the vehicle and is connected to the vent valve 10 utilizing a hose or other suitable connection device.

The vent valve 10 includes a housing 30 that is defined in part by a generally cylindrical and tubular shell 35 and an outer fill cup 40 that surrounds a portion of the shell 35. The fill cup 40 has a reduced diameter base 45 in which the shell 35 is received. Typically, the shell is received by a snap-fit of flexible fingers 50 on the shell 35 which are disposed in complementary holes 55 in the fill cup 40. An enlarged diameter sidewall 60 extends from the base 45 to an open end 65 of the fill cup 40 and defines an annular gap 70 between the sidewall 60 and the shell 35. The sidewall 60 is open at its upper end to allow liquid fuel to flow over the sidewall 60 and into the gap 70. A plurality of radially inwardly projecting and axially extending ribs 75 are formed in the sidewall 60 to position the shell 35. The fill cup 40 has a bottom wall 80 that spans the base 45 and includes through holes 147, 134 that allow fluid flow therethrough. The fill cup 40 and shell 35 are preferably formed of a material that is resistant to exposure to hydrocarbon fuels and may be a polymeric material such as acetal.

The shell 35 has a sidewall 90 in which a plurality of windows 95 are formed to allow liquid fuel to flow through the shell 35. The windows 95 preferably extend axially to a height that is equal to or below the height of the sidewall 60 of the fill cup 40, such that the portion of the sidewall 60 above the window 95 protects against splashing fuel from traveling upward relative to the vent valve 10.

A radially outwardly extending and preferably circumferentially continuous flange 110 is provided on the sidewall 90 above the windows 95 of the shell 35. The flange 110 extends radially outward to direct any of the liquid fuel that lands on the top of the flange away from the fill cup 40 to return the fuel to the fuel tank.

To facilitate locating and connecting an upper cap 115 to the shell 35, a plurality of circumferentially-spaced and radially outwardly extending tabs 120 are provided adjacent the upper end of the shell 35. At least some of these tabs 120 include radially outwardly extending catches 125 that are sized to snap-fit into complementary openings 130 in the cap 115. Ribs 122 on the shell 35 may provide additional baffles between the cap 115 and sidewall 90 to provide flow paths through which vapor may flow into the vent valve 10. Ribs 122, and axially extending fingers 124 on the upper end of the shell, space portions of the edge of the shell from the cap 115 to permit fuel vapor to flow between the shell and the cap.

Additionally, a check valve 135 controls the flow of fluid through a hole 134 in the bottom wall 80 of the cup 40. The check valve 135 has a generally flat disk 140 disposed between the bottom wall 80 and an annular retainer 145 with a through opening 146 which is located on the bottom wall 80 of the cup 40. The disk 140 is responsive to liquid fuel to close the opening 134 in the bottom wall 80 of the cup 40 to prevent liquid fuel flow from the fuel tank through the opening 146 and into the cup 40 and shell 35. When the disk 140 is not immersed in liquid fuel, any fuel within the cup 40 and shell 35 may flow through the openings 147, 134 around the disk 140 of the check valve 35, and through the opening 146 to return back to the fuel tank.

The cap 115 preferably includes a plurality of radially outwardly extending mounting tabs 150 with through holes that locate the vent valve 10 relative to the fuel tank. The cap 115 includes an upper wall 155 with a through bore 160 that defines the vapor outlet 15 through which fuel vapor may escape from the fuel tank through the vent valve 10. The vapor outlet 15 is defined in part by a nipple 165 extending from the upper wall 155 that receives a suitable conduit that allows communication between the vent valve 10 and a fuel vapor recovery canister. Additionally, a generally annular depending valve seat 170 with a radially extending elongate loop 172 is provided surrounding the outlet 15. The cap 115 has a circumferential depending skirt 175 that extends from its upper wall 155 and surrounds an upper portion of the shell 35. A plurality of holes 130 are formed in the skirt 175 each adapted to receive a catch 125 of the tabs 120 on the shell 35 to connect and retain the cap 115 with the shell 35. The flange 110 on the sidewall 90 of the shell 35 is preferably disposed adjacent to the lower edge of the skirt 175 such that the flange extends radially outwardly to at least an inner surface of the skirt 175 and even more preferably beyond an outer wall of the skirt 175 to inhibit and prevent liquid fuel from entering between the skirt 175 and the shell 35.

Figure 2:
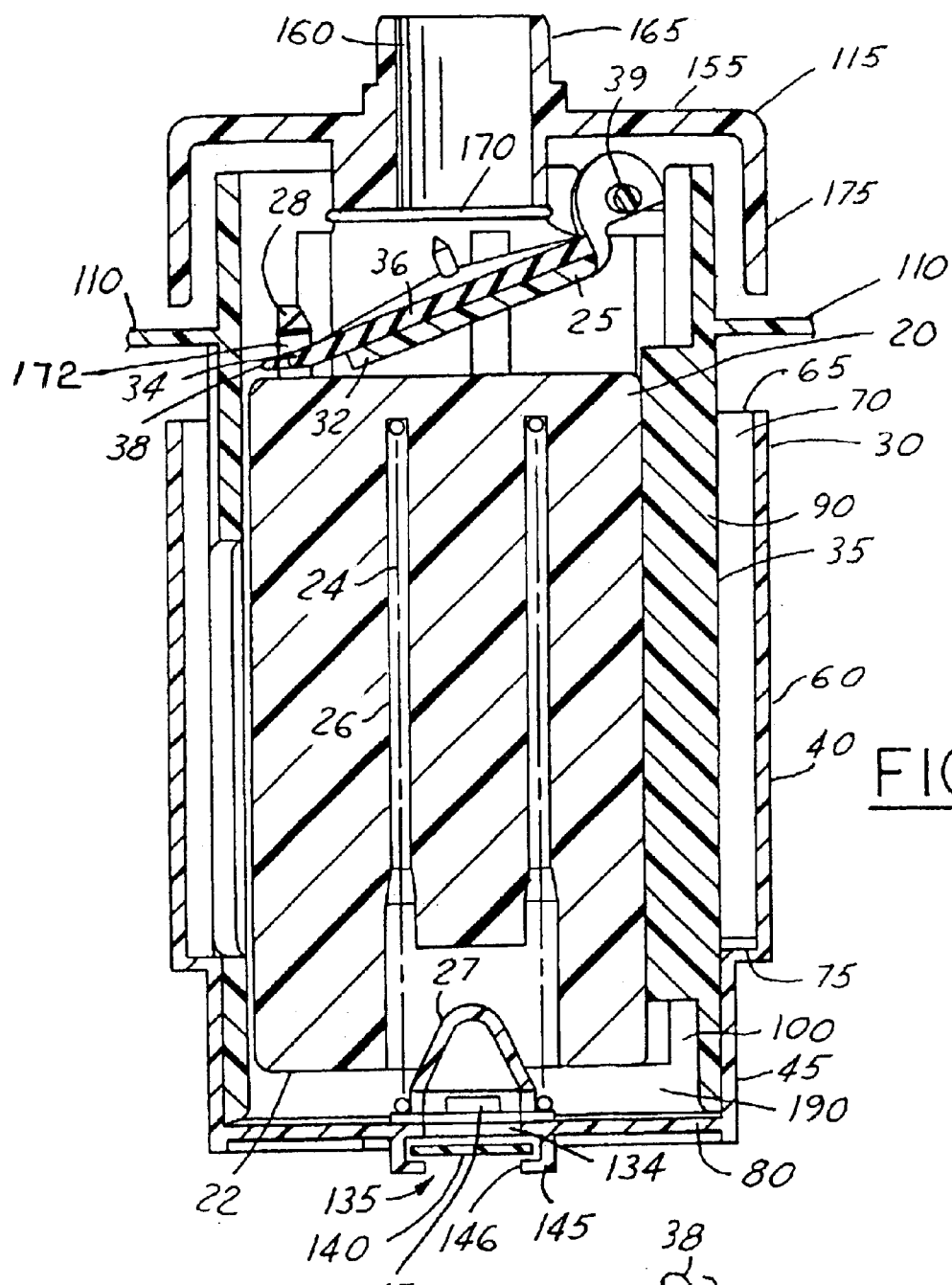
FIG. 2 is a fill sectional view detailing the vapor vent valve of the present invention.
Figure 3:
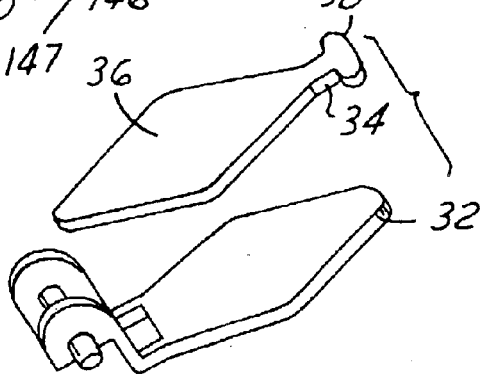
FIG. 3 is a perspective view of the closure of the vapor vent valve of the present invention.

As shown in FIG. 2, the float 20 is slidably received in an interior space 190 defined by the shell 35, bottom wall 80 of cup 40, and the cap 115. The float 20 is preferably a cylindrical body that is slidably received in the interior space 190.

The float is yieldably biased toward the closed position by a spring 24 received in a recess 26 in the bottom end of the float 22 with the other end of the spring disposed over and retained by the circular projection 27 in the bottom wall 80 of the shell 35. The circular projection 27 preferably has holes 147 formed therein to allow for the passage of liquid fuel. The spring-biased float design allows the vent valve 10 to remain closed during a rollover condition, as will be described in more detail below.

Again with reference to FIG. 2, the float 20 further includes an integrally formed connector portion 28 to attach to the closure 25. The closure 25 includes a carrier plate 32 that has a resilient elastomeric layer or sheet 34 attached on the upper face of the plate to interact with the valve seat 170. The elastomeric layer 34 includes a central portion 36 that is in juxtaposition with the carrier plate 32 and a bulbous portion 38 extending from the central portion 36. In assembly, the neck of the bulbous portion 38 is received in a slot 172 through the connector portion 28 of the float 20. The closure 25 is pivotally carried by the shell 35 via a rod 39 extending through a hinge area of the carrier plate 32. End portions of the rod 39 are received in blind slots 41 that are formed within the shell 35. In this manner, the float 20 is attached to the closure 25 such that movement of the float 20 causes the closure to pivot about an axis defined by the rod 39 that is connected to the shell 35. Therefore, movement of the float actuates the closure to open and closed positions.

The closure 25 is adapted to engage the valve seat 170 when the float 20 is moved sufficiently away from the bottom wall of the cup 40. The combination of the float 20 and spring 24 is buoyant in liquid fuel such that when liquid fuel enters the cup 40 and rises in the chamber 190, the float is raised upwardly causing engagement of the closure 25 with the valve seat 170. Preferably, the weight of the float 20 is chosen such that when liquid fuel is no longer within the chamber 190, the weight of the float 20 is sufficient to remove the closure 25 from the valve seat 170 and reopen the vapor outlet 15. The weight of the float 20 and the spring rate of and the force produced by the spring 24 biasing it are also chosen such that if the vent valve 10 is turned over, such as during a vehicle rollover condition, the float 20 will urge the closure 25 into engagement with the valve seat 170 even when the float 20 is completely immersed in liquid fuel to prevent liquid fuel from flowing through the closure 25 and out of the vapor outlet 15.

In operation, when an insufficient amount of liquid fuel acts on the float 20, the closure 25 is disengaged from the valve seat 170 of the cap 115, allowing fuel vapors within the fuel tank to flow through the vapor passage between the skirt 175 and sidewall 90 and out of the vapor outlet 15. Fuel vapor may also flow through the windows 95 and the shell 35 around the float 20 and out of the vapor outlet 15.

During refueling, when liquid fuel is added to the fuel tank by a filler nozzle of a fuel station pump, the level of fuel in the tank rises and eventually liquid fuel will engage the bottom of the fill cup 40. As liquid fuel flows through the hole 146 of the check valve 135 in the bottom wall 80 of the fill cup 40, the buoyant valve disk 140 is raised into engagement with the bottom wall 80 of the shell 35 to close the hole 134 and prevent liquid fuel from entering the interior space of the vent valve. The level of fuel in the tank continues to rise as fuel is added until the level of fuel reaches the open upper end 65 of the fill cup 40. When the level of fuel is higher than the fill cup 40, fuel pours into the fill cup 40, through the windows 95 in the shell 35 and rapidly fills the interior space 190 of the vent valve 10.

As the level of liquid fuel rises in the interior space 190, the float rises until the closure 25 at least partially engages the valve seat 170, thereby at least significantly restricting or even closing off the vapor outlet 15. When the vapor outlet 15 is sufficiently restricted or closes, the pressure within the fuel tank rises as fuel is added to the tank and causes fuel to rise or back up within the fill pipe to engage the fuel filling nozzle and actuate its automatic shut off.

Thereafter, if further refueling is attempted, any additional fuel that is added to the tank slightly raises the level of fuel in the tank further with a corresponding rise of the fuel level in the vent valve 10, thereby moving the closure 25 to a fully closed position. This causes the pressure within the fuel tank to again increase and the automatic shutoff of the nozzle is actuated by liquid fuel backing up into the fill pipe. Because the float 20 may have been raised by splashing, sloshing or surging fuel causing engagement of the closure 25 with the valve seat 170 of the closure 25, it may again move away from the valve seat 70 when the fuel settles in the tank, thereby allowing additional fuel to be added to the fuel tank. When the level of fuel is such that the float 20 causes the closure 25 to remain engaged with the valve seat 170, no further fuel may be added to the fuel tank because of the lack of venting of fuel vapor through outlet 15 and the resulting increased pressure in the fuel tank causes fuel to back up into the fill pipe and actuate the automatic shut-off of the nozzle. The vapor outlet 15 remains completely closed until the level of fuel in the tank is decreased a sufficient amount to permit the float 20 to fall away from the valve seat 170 thereby moving the closure 25 to its open position and permitting fuel vapor to escape out of the fuel tank.

To ensure opening of closure 25 by the float 20 when the fuel level in the tank drops, under conditioning where the pressure within the tank is greater than the pressure in the outlet and hence the pressure differential on the opposed faces of the closure 25 urges it into engagement with the valve seat 170 (the so-called corking problem), the loop portion 172 of the valve seat in conjunction with initial pivotal movement of the closure layer 36 provides as initial small area adjacent bulbous tip 38 which first cracks or opens slightly to relieve this pressure differential and permit the closure to be readily fully opened by the float when the fuel level in the tank drops sufficiently.

While the presently preferred embodiment has been disclosed, a worker in this art would understand that various modifications would come within the scope of the invention as defined by the following claims.

I claim:
1. A vapor vent valve for a fuel tank, comprising:
  (a) a vapor outlet connecting an interior of the fuel tank with an exterior of the fuel tank;
  (b) a fill cup having an opening at one end and a sidewall extending to the open end;
  (c) a shell defining an interior space, disposed in part in the fill cup and having a sidewall with an opening therethrough and an upper edge;
  (d) a flow passage defined between the fill cup sidewall and the shell sidewall communicating with the opening of the fill cup and the opening through the sidewall to permit fluid which flows into the opening of the fill cup to enter the interior space through the opening in the sidewall of the shell;
  (e) a float slidably received in the interior space and responsive to the level of liquid fuel in the interior space;
  (f) a closure pivotally carried by the shell and movable to a closed position to prevent fluid flow through the vapor outlet and movable to an open position spaced from the closed position allowing fuel vapor to exit the fuel tank through the vapor outlet; and
  (g) the closure comprising a carrier plate and an elastomeric layer attached to the carrier plate, the elastomeric layer including a portion connected to the float for actuating the closure to the open and closed positions in response to movement of the float.

2. The valve of claim 1 wherein the elastomeric layer includes a section extending from a central portion of the elastomeric layer.

3. The valve of claim 2 wherein the float includes a connector portion that receives and retains at least part of the section extending from the central portion of the elastomeric layer for linking the float and the closure.

4. The valve of claim 3 wherein the connector portion comprises an integrally formed snap fitting sized to accommodate the section extending from the central portion of the elastomeric layer.

5. The valve of claim 1 further comprising a bottom wall of the fill cup defining in part the interior space and a check valve which prevents liquid fuel flow from the fuel tank into the interior space through the opening in the bottom wall of the fill cup and permits liquid fuel flow from the interior space to the fuel tank under at least some fuel level conditions in the fuel tank.

6. The valve of claim 5 wherein the check valve comprises a disk buoyant in liquid fuel which when immersed in liquid fuel is raised into engagement with the bottom wall of the fill cup to close the opening in the bottom wall.

7. The valve of claim 1 wherein the shell has an outwardly extending flange which directs liquid fuel landing on the flange away from the opening of the fill cup.

8. The valve of claim 7 wherein the flange extends radially outwardly from the shell such that any fuel flowing out of the vapor flow path flows on the flange and is directed by the flange back to the fuel tank.

9. The valve of claim 1 further including a spring in association with the float for exerting a force upon the float that maintains the closure in a closed position in the event of a vehicle roll over.

10. The valve of claim 1 which also comprises a cap attached to the shell and having an opening defining the vapor outlet.

* * * * *